No. 713,799. Patented Nov. 18, 1902.
J. REED.
AUTOMATIC POULTRY FOUNTAIN.
(Application filed Aug. 5, 1902.)
(No Model.)
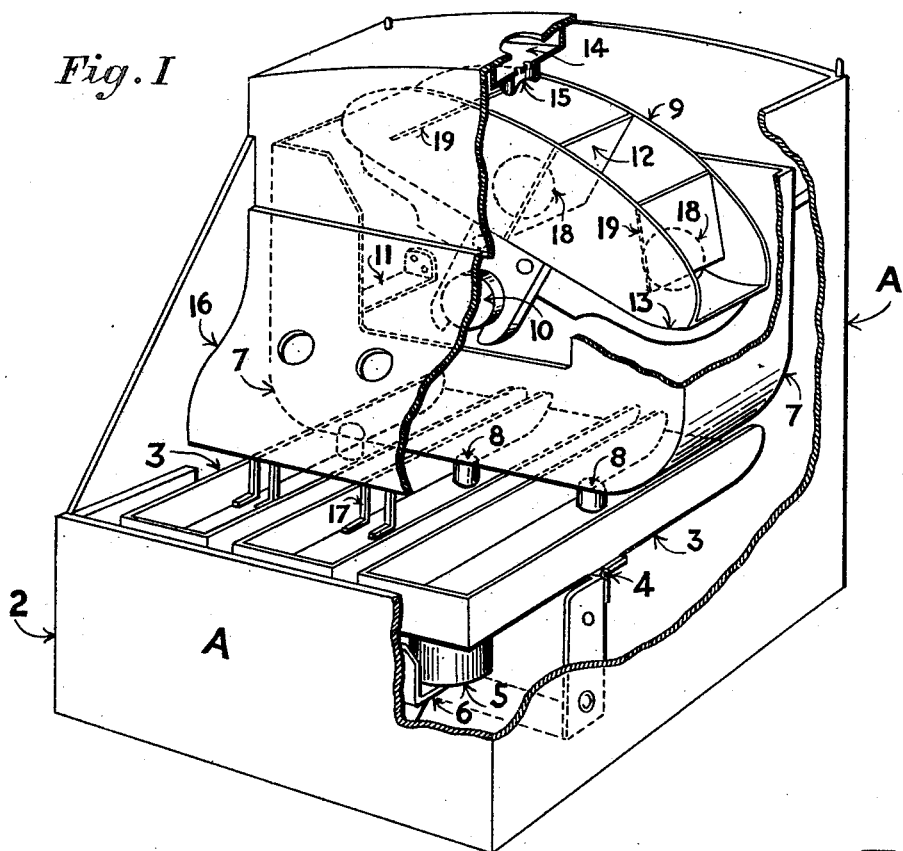
Fig. I
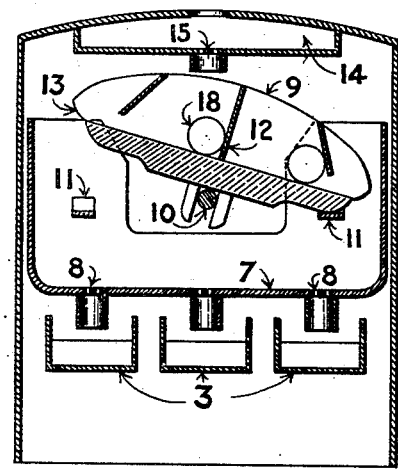
Fig. 2
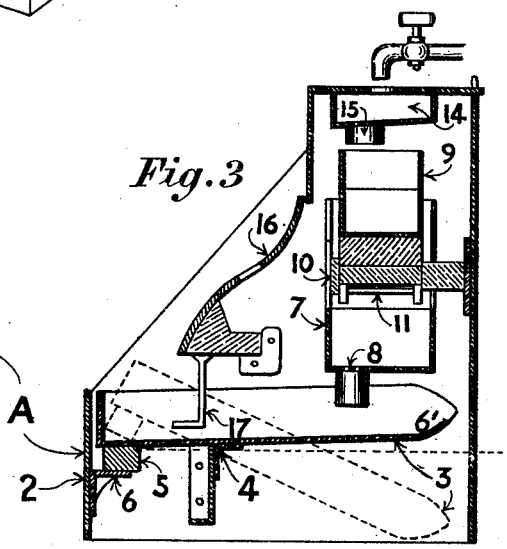
Fig. 3
Witnesses,
Inventor,
James Reed

UNITED STATES PATENT OFFICE.

JAMES REED, OF BERKELEY, CALIFORNIA.

AUTOMATIC POULTRY-FOUNTAIN.

SPECIFICATION forming part of Letters Patent No. 713,799, dated November 18, 1902.

Application filed August 5, 1902. Serial No. 118,475. (No model.)

*To all whom it may concern:*

Be it known that I, JAMES REED, a citizen of the United States, residing at Berkeley, county of Alameda, State of California, have invented an Improvement in Automatic Poultry-Fountains; and I hereby declare the following to be a full, clear, and exact description of the same.

My invention relates to improvements in poultry drinking-fountains; and its object is to provide a cheap, simple, indestructible, and economically-operated device which will automatically fill, cleanse, and refill itself and in which the water will always be clear and pure, thereby avoiding to a very great extent disease among the fowls.

It consists of the parts and the construction and combination of parts hereinafter described, having reference to the accompanying drawings, in which—

Figure 1 is a general perspective view of fountain. Fig. 2 is a transverse section through feed-box. Fig. 3 is a longitudinal section.

A represents a casing of suitable design, size, and material. As to the latter, the casing and, in fact, nearly the entire fountain are preferably made of galvanized iron. The casing is made, as here shown, with a low vertical front wall 2 and with the side walls inclined back and upward. In the lower part of the casing and extending from front to rear thereof are the drinking-pans 3. These latter are all pivotally supported, as at 4, and are weighted at their front ends at 5. These weights are adapted to rest on supports 6 on the front wall, and when the pans are in normal horizontal position the upper edges of the pans are flush with the top of the wall or ledge 2. The bottoms of the pans are inclined and curved upwardly abruptly at the rear end, as at 6'. The inclination of each pan and the disposition of its pivot 4 in relation to the center of gravity of the pan are such that the moment the water rises in the pan to a point where it would overflow at the rear end the pan dumps itself. The pan, however, will not dump automatically until such time. As soon as the water is discharged the weight 5 throws the pan back again into horizontal position ready for refilling. The pans forward of their center of gravity are uncovered, so that fowls have access for drinking purposes. The rear ends of the pans extend back under the distributing-tank 7, which is disposed transversely of the pans and discharges into the latter through perforations 8 in its bottom. The bottom of the tank 7 is curved at the ends instead of being made square, so that there shall be no splash, and the whole bottom of the tank will be flushed when the tilting feed-box 9 discharges at alternate ends into the tank. This feed-box may be journaled in the tank, or the sides of the latter may be cut away and a stud 10 extend outward from the rear wall of the casing and across the tank, as shown, or where the box is removably pivoted. The oscillation of the box in either direction is limited by the stops 11, extending across the interior of the tank. The box is pivoted centrally, so as to have an equal oscillating movement in either direction. The box is divided centrally by a vertical partition 12 and is open at the ends, except that the bottom curves up slightly at each end, as at 13. The upward curve of these ends and the disposition of the pivot 10 below the box is such that when one end of the box is resting on a stop 11 the elevated end will form a water-receiving receptacle which will be tilted to discharge its load at the moment overflow over that end is about to take place, but will not discharge before that time. The filling of the spaces alternately on either side of the partition 12 takes place from the reservoir-chamber 14, located above the feed-box and having a central discharge 15 in line with pivot 10. Into the reservoir the water is supposed to be admitted drop by drop or according to the capacity of the fountain and the consumption by the fowls having access thereto. Passing through passage 15 the water gradually fills the space on one side or the other of partition 12 in the feed-box until by gravity that end tilts and discharges its contents in the tank 7, thus leaving the other end of the box now elevated and ready to be filled.

The water in the tank percolates gradually and equally through all the perforations 8 into each and all of the pans. As the feed of water to reservoir 14 is presumably constant the drinking-pans will fill and empty themselves during the night-time or when the fountain is not in use, and the alternate discharge from the ends of box 9 serves to flush the tank first from one end and then from the other, so that no part of the apparatus has opportunity to become fouled.

The space above the pans, except at their front ends, which is left uncovered for drinking-openings, is covered by a perforated plate or apron 16, which protects the feed-box, reservoir, and rear end of the pans from dirt, &c. The outer and lower edge of the plate extends in front of the pivot 4, and projections 17 extend downwardly from this edge into the pans, so that by no mischance could a pan be dumped by any actions of the fowls drinking from or jumping upon or into the pans. These projections, moreover, serve to limit the tilt when the pans discharge and insure the latter righting themselves again properly.

There may be as many drinking-pans disposed side by side as desired. The length and the capacity of the reservoir and of the tilting feed-box would be according to the number and size of the pans.

It is essential that the space on either side of partitions 12 of the feed-box should contain sufficient water to flow over the entire bottom of the reservoir and allow an equal distribution of water to each pan.

Where the length of the tilting box is considerably increased by reason of the greater number of pans, I insert two ball-weights 18 into the box, one on either side of the partition, which are adapted to reciprocate back and forth during the oscillation of the pans. Stops 19 are disposed at equal distances from the partition 12, whereby the reciprocation of the balls in the box is limited. When one end of the box is down, the ball at that end will rest against a stop 19 and the ball in the elevated end will rest against the partition, so that the elevated end of the tank will hold an amount of water in excess of what it would were the balls not used by just so much as is required to overcome the leverage exerted by the ball in the lower compartment.

Having thus described my invention, what I claim, and desire to secure by Letters Patent, is—

1. The combination in an automatic poultry-fountain of tilting feed-pans, a reservoir disposed transversely above said pans having discharge-passages into each of said pans, means for delivering water into said reservoir, and means by which the pans are made to dump themselves to discharge their load, and to right themselves again after such discharge.

2. The combination in an automatic poultry-fountain of feed-pans pivoted to one side of the center of gravity, said pans adapted to dump their load when filled beyond a predetermined point and to right themselves when said load is discharged, and means disposed above said pans by which water is delivered at intervals equally to each of said pans.

3. The combination in an automatic poultry-fountain of tilting feed-pans adapted normally to rest in horizontal position and to dump themselves when filled beyond a predetermined point, a water-supply means disposed above said pans, a casing inclosing said water-supply means, and stop means by which the tilting movement of the pans is limited.

4. The combination in an automatic poultry-fountain of feed-pans pivoted at one side of the center of gravity and adapted to dump their load when filled beyond a predetermined point, and to right themselves when the load is discharged, a reservoir disposed above said pans and having outlets thereinto, and a gravity-actuated tilting feed-box adapted to discharge its contents intermittently from opposite ends into said reservoir.

5. The combination in an automatic poultry-fountain of feed-pans pivoted at one side of the center of gravity and adapted to dump their load when filled beyond a predetermined point, and to right themselves when the load is discharged, a feed-reservoir in relation thereto, a gravity-actuated centrally-pivoted feed-box divided centrally into two compartments and adapted to discharge from opposite ends into said reservoir.

6. The combination in an automatic poultry-fountain of feed-pans pivoted at one side of the center of gravity and adapted to dump their load when filled beyond a predetermined point, and to right themselves when the load is discharged, a reservoir, a centrally-pivoted oscillating feed-box having a plurality of compartments, a source of supply situated above said feed-box and adapted to discharge alternately into said compartments, and means for limiting the oscillation of said box.

7. The combination in an automatic poultry-fountain of drinking-receptacles, and a centrally-pivoted oscillating gravity-actuated feed-box disposed above said receptacles, a source of supply discharging into said feed-box, and means by which the contents of the latter are distributed equally to the drinking-receptacles.

8. The combination in an automatic poultry-fountain of tilting drinking-pans, means by which said pans are made to lie normally in a horizontal plane said pans having discharge-outlets at their rear ends, a reservoir disposed transversely of said pans, and having discharge-outlets thereinto, a centrally-pivoted oscillating gravity-actuated feed-box disposed in relation to said reservoir and having a plurality of compartments, and a source of supply by which said compartments are alternately filled to cause the box to tilt and discharge its contents.

9. The combination in a poultry-fountain of horizontally-disposed drinking-pans pivoted rearward of their center of gravity, said pans having their bottoms inclined upwardly and rearwardly, overflow-vents at the back end of said pans, said pans tilting automatically when the water rises to the level of said vents, water-supply means above said pans, a casing inclosing said water-supply means and said pans except for a drinking-space above said pans forward of their pivots, and projections on the wall of the casing rearward of said drinking-space extending downwardly into the pans.

In witness whereof I have hereunto set my hand.

JAMES REED.

Witnesses:
LIONEL S. RODGERS,
EDWARD A. LUND.